(12) United States Patent
Nakanishi et al.

(10) Patent No.: US 9,566,924 B2
(45) Date of Patent: Feb. 14, 2017

(54) VEHICULAR IMPACT ABSORBING MEMBER

(71) Applicants: Makoto Nakanishi, Toyota (JP); Yutaka Yamada, Tokyo (JP)

(72) Inventors: Makoto Nakanishi, Toyota (JP); Yutaka Yamada, Tokyo (JP)

(73) Assignee: Toyoda Iron Works Co., Ltd., Toyota-shi, Aichi (JP)

(*) Notice: Subject to any disclaimer, the term of this patent is extended or adjusted under 35 U.S.C. 154(b) by 0 days.

(21) Appl. No.: 14/768,462

(22) PCT Filed: Sep. 12, 2013

(86) PCT No.: PCT/JP2013/074656
§ 371 (c)(1),
(2) Date: Aug. 18, 2015

(87) PCT Pub. No.: WO2014/129002
PCT Pub. Date: Aug. 28, 2014

(65) Prior Publication Data
US 2016/0001725 A1  Jan. 7, 2016

(30) Foreign Application Priority Data
Feb. 25, 2013 (JP) .................................. 2013-035089

(51) Int. Cl.
*B60R 19/34* (2006.01)
*B60R 19/24* (2006.01)
*B60R 19/26* (2006.01)

(52) U.S. Cl.
CPC .......... *B60R 19/34* (2013.01); *B60R 2019/247* (2013.01); *B60R 2019/262* (2013.01)

(58) Field of Classification Search
CPC .. A47F 3/0447; F25D 21/125; B01D 11/0276; B01D 46/0005; D21F 1/02; B60P 3/08; G07B 15/063; B62D 1/28; G01S 13/931; G01C 21/28
(Continued)

(56) References Cited

U.S. PATENT DOCUMENTS 7,300,080 B2 * 11/2007 Rebuffet .................. B60R 19/24
293/102
7,543,537 B2 * 6/2009 Seitzberger ............. B60R 19/34
105/392.5

(Continued)

FOREIGN PATENT DOCUMENTS

| CN | 101767557 A | 7/2010 |
|---|---|---|
| JP | 2010019414 A | 1/2010 |
| JP | 2010-149771 | 7/2010 |

OTHER PUBLICATIONS

Office Action issued in Chinese patent application No. 201360073142.4 on Jun. 27, 2016.

*Primary Examiner* — Karin B Patel
(74) *Attorney, Agent, or Firm* — Finnegan, Henderson, Farabow, Garrett & Dunner, LLP (57) ABSTRACT

A vehicle shock absorbing member, which has a tubular shape having a plurality of flat plate-shaped sidewalls and having a closed section, in which, of the plurality of sidewalls, each of a pair of sidewalls located on right and left sides and separated from each other in a lateral direction of a vehicle has a groove portion formed extending in an axial direction of the tubular shape so as to be recessed inward, which is disposed between a vehicle body-side member and a bumper member in such an attitude that the axial direction corresponds to a longitudinal direction of the vehicle, and which, when subjected to a compressive load, is crushed like an a bellows in the axial direction to absorb impact energy, (Continued)

a pair of flat plate-shaped partition walls being formed in the tubular shape integrally with the tubular shape so as to be separated from each other in a vertical direction and so as to couple the pair of sidewalls, and the upper partition wall being tilted downward and the lower partition wall being tilted upward such that an interval between the pair of partition walls decreases closer to an inner side of the vehicle in the lateral direction of the vehicle.

6 Claims, 7 Drawing Sheets

(58) Field of Classification Search
USPC .......................................................... 293/133
See application file for complete search history.

(56) References Cited

U.S. PATENT DOCUMENTS

| | | | | |
|---|---|---|---|---|
| 7,614,658 B2 * | 11/2009 | Yamada | ............... | B62D 21/152 280/784 |
| 8,353,545 B1 * | 1/2013 | Baldwin | ................. | B60R 19/34 188/374 |
| 8,430,437 B2 * | 4/2013 | Asakawa | ................ | B60R 19/34 293/132 |
| 8,632,108 B2 * | 1/2014 | Matuschek | .......... | B62D 21/152 293/133 |
| 8,939,480 B1 * | 1/2015 | Barbat | .................... | B60R 19/34 293/133 |
| 9,187,127 B2 * | 11/2015 | Tyan | .................... | B62D 21/152 |
| 9,327,665 B2 * | 5/2016 | Barbat | .................... | B60R 19/34 |
| 2002/0063433 A1 * | 5/2002 | Gotanda | ................. | B60R 19/34 293/132 |
| 2006/0066115 A1 * | 3/2006 | Haneda | ..................... | F16F 7/12 293/133 |
| 2006/0202493 A1 * | 9/2006 | Tamura | .................... | F16F 7/123 293/133 |
| 2008/0012386 A1 * | 1/2008 | Kano | ..................... | B60R 19/34 296/187.03 |
| 2008/0106107 A1 * | 5/2008 | Tan | ......................... | B60R 19/34 293/133 |
| 2008/0217935 A1 * | 9/2008 | Braunbeck | ............. | F16F 7/123 293/132 |
| 2008/0224487 A1 * | 9/2008 | Wang | ...................... | B60R 19/34 293/132 |
| 2009/0001737 A1 * | 1/2009 | Salomonsson | .......... | B60R 19/34 293/133 |
| 2009/0026777 A1 * | 1/2009 | Schmid | ................... | B60R 19/34 293/133 |
| 2009/0085362 A1 * | 4/2009 | Terada | .................... | B60R 19/34 293/132 |
| 2009/0115208 A1 * | 5/2009 | Kano | ........................ | F16F 7/12 293/132 |
| 2009/0261602 A1 * | 10/2009 | Karlander | ............... | B60R 19/34 293/132 |
| 2010/0066124 A1 * | 3/2010 | Terada | ................. | B62D 21/152 296/187.09 |
| 2010/0164238 A1 * | 7/2010 | Nakanishi | ................. | F16F 7/12 293/132 |
| 2010/0194125 A1 * | 8/2010 | Wibbeke | ................. | B60R 19/24 293/120 |
| 2011/0015902 A1 * | 1/2011 | Cheng | ................. | B62D 21/152 703/1 |
| 2011/0187135 A1 * | 8/2011 | Kano | ...................... | B60R 19/34 293/133 |
| 2012/0261949 A1 * | 10/2012 | Tyan | ...................... | B60R 19/34 296/187.03 |
| 2013/0001964 A1 * | 1/2013 | Freundl | ................... | B60R 19/18 293/133 |
| 2013/0300138 A1 * | 11/2013 | Banasiak | ................ | B60R 19/34 293/133 |
| 2014/0292007 A1 * | 10/2014 | Kawamata | .............. | B60R 19/34 293/133 |
| 2015/0197206 A1 * | 7/2015 | Tamura | .................... | B60R 19/34 293/133 |
| 2015/0232050 A1 * | 8/2015 | Yamada | .................. | B60R 19/34 296/187.1 |
| 2015/0314743 A1 * | 11/2015 | Matsushiro | ........... | B60R 19/023 293/133 |
| 2015/0343972 A1 * | 12/2015 | Lee | ......................... | B60R 19/34 293/133 |
| 2016/0039373 A1 * | 2/2016 | Yamada | .................. | B60R 19/24 293/132 |
| 2016/0046250 A1 * | 2/2016 | Sotoyama | ............ | B62D 21/152 293/155 |
| 2016/0144814 A1 * | 5/2016 | Ahn | ......................... | B23K 9/16 293/133 |
| 2016/0176442 A1 * | 6/2016 | Miyagano | ............ | B62D 21/152 296/193.09 |

\* cited by examiner

VEHICULAR IMPACT ABSORBING MEMBER

CROSS-REFERENCE TO RELATED APPLICATIONS

This application is a national phase application of International Application No. PCT/JP2013/074656, filed Sep. 12, 2013, and claims the priority of Japanese Application No. 2013-035089, filed Feb. 25, 2013, the content of both of which is incorporated herein by reference.

TECHNICAL FIELD

The present invention relates to vehicle shock absorbing members, and more particularly to a technique of improving shock absorbing performance in the case where the vehicle shock absorbing member is subjected to an impact load applied obliquely from the front of a vehicle or obliquely from the rear of the vehicle.

BACKGROUND ART

Vehicle shock absorbing members are known in the art (a) which has a tubular shape having a plurality of flat plate-shaped sidewalls and having a closed section, in which, of the plurality of sidewalls, each of a pair of sidewalls located on the right and left sides and separated from each other in the lateral direction of a vehicle has a groove portion formed in the axial direction of the tubular shape so as to be recessed inward, (b) which is disposed between a vehicle body-side member and a bumper member in such an attitude that the axial direction corresponds to the longitudinal direction of the vehicle, and which, when subjected to a compressive load, is crushed like a bellows in the axial direction to absorb impact energy. Patent Document 1 describes an example of such vehicle shock absorbing members, in which each of a pair of narrow sidewalls located at the top and bottom of the tubular shape is provided with wing-like flanges extended to the right and left so as to be substantially parallel to the narrow sidewalls, thereby suppressing lateral buckling of the vehicle shock absorbing member due to an impact load that is applied obliquely in the lateral direction of the vehicle.

RELATED ART DOCUMENT

Patent Document

Patent Document 1: Japanese Patent Application Publication No. 2010-149771

SUMMARY OF THE INVENTION

Problems to be Solved by the Invention

Figure 10:
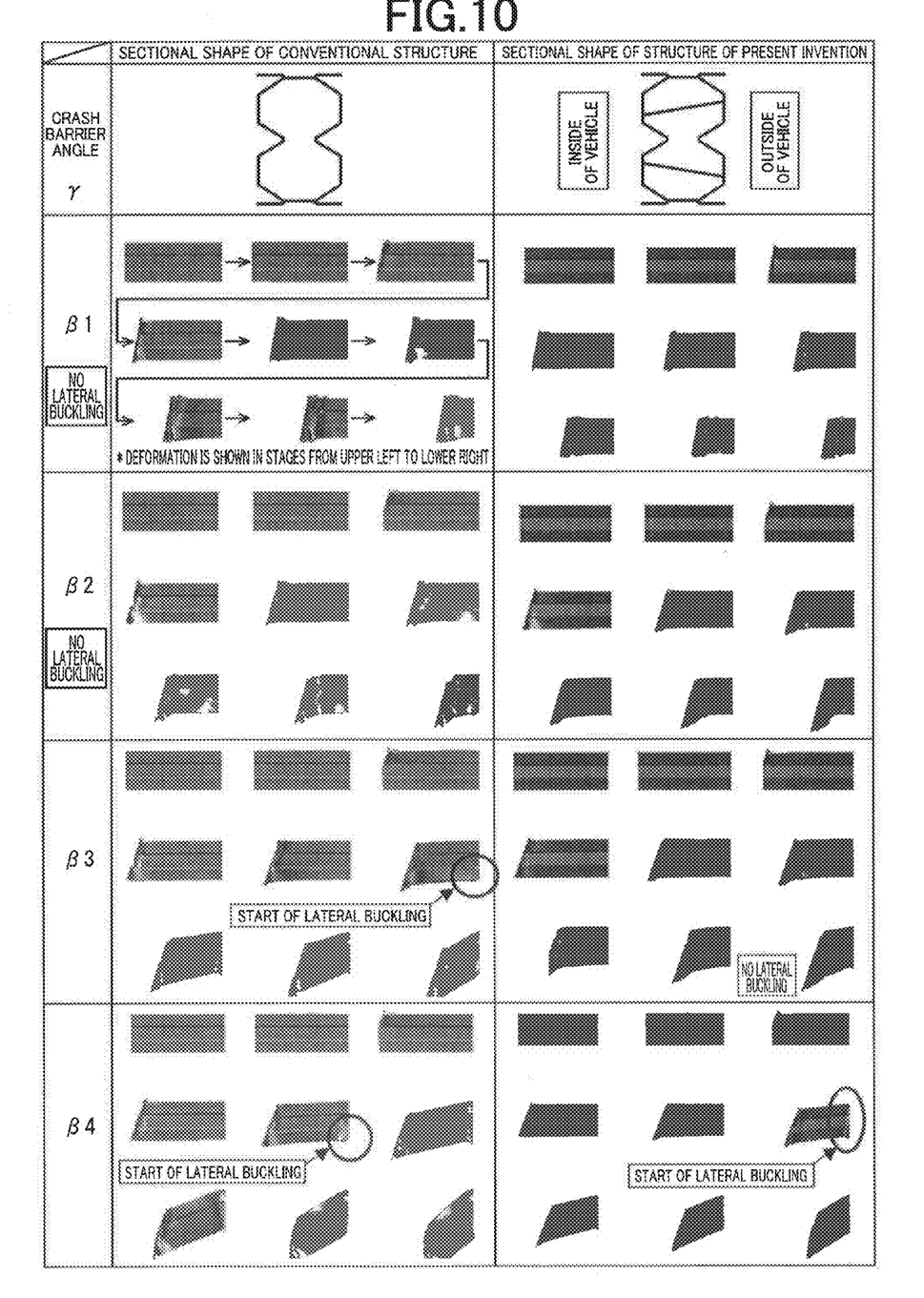
FIG. 10 is a diagram illustrating deformation of the product of the present invention and the conventional product in nine stages, which was obtained by simulating by FEM analysis of a crushing process therebetween in the offset crash test of FIG. 3 performed at the barrier angle γ of β1, β2, β3, and β4.

However, even in the vehicle shock absorbing member having such wing-like flanges, lateral buckling occurs as shown in the left column of FIG. 10 as a barrier angle γ (see FIG. 3) in an offset crash test increases. This vehicle shock absorbing member still has room for improvement in order to further improve shock absorbing performance. FIG. 10 is a diagram illustrating deformation of the vehicle shock absorbing members in nine stages at fixed time intervals, which was obtained by simulating by FEM analysis of a crushing process in the crash test performed at four barrier angles γ of a crash surface 52 of a crash barrier 50 shown in FIG. 3, namely β1, β2, β3, and β4 (β1<β2<β3<β4), and a vehicle speed V1 of 16 km/h. In the conventional product shown in the left column, lateral buckling did not occur when γ was β1 and β2, but lateral buckling started in the sixth stage when γ was β3. Moreover, lateral buckling started in the fifth stage when γ was β4. FIG. 4 is a diagram illustrating a mechanism in which lateral buckling occurs due to a load F that is applied obliquely in the lateral direction. The vehicle shock absorbing member is subjected to a moment load M due to the load F, and thus tends to laterally buckle toward the inner side of the vehicle (the leftward direction in FIG. 4).

The present invention was developed in view of the above circumstances, and it is an object of the present invention to improve resistance to lateral buckling under an impact load that is applied obliquely in the lateral direction of a vehicle, and thus to more stably obtain shock absorbing performance.

Means for Solving the Problem

To achieve the object, the first aspect of the invention provides a vehicle shock absorbing member, (a) which has a tubular shape having a plurality of flat plate-shaped sidewalls and having a closed section, in which, of the plurality of sidewalls, each of a pair of sidewalls located on right and left sides and separated from each other in a lateral direction of a vehicle has a groove portion formed extending in an axial direction of the tubular shape so as to be recessed inward, (b) which is disposed between a vehicle body-side member and a bumper member in such an attitude that the axial direction corresponds to a longitudinal direction of the vehicle, and which, when subjected to a compressive load, is crushed like a bellows in the axial direction to absorb impact energy, the vehicle shock absorbing member characterized in that (c) a pair of flat plate-shaped partition walls are formed in the tubular shape integrally with the tubular shape so as to be separated from each other in a vertical direction and so as to couple the pair of sidewalls, and (d) the upper partition wall is tilted downward and the lower partition wall is tilted upward such that an interval between the pair of partition walls decreases closer to an inner side of the vehicle in the lateral direction of the vehicle.

The second aspect of the invention provides a vehicle shock absorbing member, (a) which has a tubular shape with a closed section that has an elongated shape with a pair of parallel long sides separated from each other in a lateral direction of a vehicle, in which each of a pair of wide sidewalls forming the long sides has a groove portion formed extending in an axial direction of the tubular shape so as to be recessed inward, (b) which is disposed between a vehicle body-side member and a bumper member in such an attitude that the axial direction corresponds to a longitudinal direction of the vehicle, and which, when subjected to a compressive load, is crushed like a bellows in the axial direction to absorb impact energy, the vehicle shock absorbing member characterized in that (c) a pair of flat plate-shaped partition walls are formed integrally with the tubular shape so as to be disposed in upper and lower parts of the tubular shape divided by the groove portions such that the pair of partition walls couple the pair of wide sidewalls, and (d) the upper partition wall is tilted downward and the lower partition wall is tilted upward such that an interval between the pair of partition walls decreases closer to an inner side of the vehicle in the lateral direction of the vehicle.

The third aspect of the invention provides the vehicle shock absorbing member recited in the first or second aspect of the invention, characterized in that (a) the vehicle shock absorbing member is a member produced by extrusion molding of a metal, and (b) the pair of partition walls and the pair of sidewalls are formed integrally with each other to extend parallel to the axial direction, and in a section perpendicular to the axial direction, an absolute value [θ] of a tilt angle θ of each of the pair of partition walls with respect to a horizontal direction is in a range of 0°<[θ]≤20°.

The fourth aspect of the invention provides the vehicle shock absorbing member recited in any one of the first to third aspects of the invention, characterized in that the pair of partition walls are tilted symmetrically with respect to the horizontal direction in the section perpendicular to the axial direction.

Effects of the Invention

In the vehicle shock absorbing member recited in the first aspect of the invention, the pair of flat plate-shaped partition walls are provided so as to be separated from each other in the vertical direction and so as to couple the sidewalls on both sides thereof in the lateral direction of the vehicle. Moreover, the pair of partition walls are tilted so that the interval therebetween decreases as they get closer to the inner side of the vehicle in the lateral direction of the vehicle. This improves resistance to lateral buckling under an impact load that is applied obliquely from the outside of the vehicle. Accordingly, even if the vehicle shock absorbing member is subjected to a moment load M due to an impact load applied obliquely in the lateral direction of the vehicle, lateral buckling is suppressed by the presence of the pair of partition walls, whereby excellent shock absorbing performance is stably obtained.

In the vehicle shock absorbing member recited in the second aspect of the invention, the vehicle shock absorbing member has the tubular shape with a closed section that has an elongated shape with the pair of parallel long sides separated from each other in the lateral direction of the vehicle. Moreover, each of the pair of wide sidewalls forming the long sides has the groove portion formed. Since the pair of partition walls are formed so as to be disposed in upper and lower parts of the tubular shape divided by the groove portions as is the case of the first aspect of the invention, the vehicle shock absorbing member recited in the second aspect of the invention achieves the substantially same actions and effects as the first aspect of the invention. The pair of partition walls are provided so as to be separated from each other in the vertical direction with the groove portions interposed therebetween, and both ends of the partition walls are coupled to the wide sidewalls. This can improve the resistance to lateral buckling without degrading bellows-type crushing properties due to the groove portions, whereby excellent shock absorbing performance is more stably obtained.

The vehicle shock absorbing member recited in the third aspect of the invention is the member produced by extrusion molding of a metal. The pair of partition walls are provided parallel to the axial direction of the tubular shape, and the absolute value [θ] of the tilt angle θ of each partition wall with respect to the horizontal direction is in the range of 0°<[θ]≤20°. This can improve the resistance to lateral buckling while ensuring extrusion moldability. That is, in order to improve the resistance to lateral buckling, it is more desirable that the absolute value [θ] of the tilt angle θ have a larger value. However, it is difficult to perform extrusion molding if the absolute value [θ] of the tilt angle θ is larger than 20°. It is therefore desirable to set the tilt angle θ in the range of 0°<[θ]≤20°.

In the fourth aspect of the invention, the pair of partition walls are tilted symmetrically with respect to the horizontal direction. Accordingly, the moment load M etc. is substantially uniformly applied to the pair of partition walls, and the resistance to lateral buckling can be appropriately improved.

MODES FOR CARRYING OUT THE INVENTION

A vehicle shock absorbing member of the present invention can be applied to both an attachment portion of a bumper member that is attached to the front side of a vehicle and an attachment portion of a bumper member that is attached to the rear side of a vehicle, but may be applied to only one of the attachment portions of the bumper members. The longitudinal shape of the bumper member, namely the shape of the bumper member as viewed in plan from above the vehicle, is desirably a smoothly curved shape protruding forward in the middle in the case of, e.g., a front bumper, but may be in various forms such as a substantially linear shape, a shape with only both ends being tilted or curved rearward. The vehicle shock absorbing member is disposed in such an attitude that the axial direction of the tubular shape corresponds to the longitudinal direction of the vehicle. However, the axial direction need not necessarily exactly correspond to the longitudinal direction of the vehicle. Depending on the shape of the bumper member etc., the vehicle shock absorbing member may be disposed in such an attitude that the axial direction of the tubular shape is tilted in the lateral direction or the vertical direction.

The vehicle shock absorbing member has a body portion having, e.g., the tubular shape, and a pair of attachment plates that are fixedly attached to both ends in an axial direction of the body portion. For example, in the body portion, (a) the section perpendicular to the axial direction of the tubular shape has a flattened polygonal shape that is a polygon with an even number of sides equal to or more than four, and (b) each of the pair of sidewalls that form in the polygonal section two sides separated from each other in the lateral direction of the vehicle and extending substantially vertically (in the vertical direction of the vehicle) and parallel to each other has the groove portion formed in the axial direction so as to be recessed inward. However, the section perpendicular to the axial direction of the tubular shape may be a simple regular polygonal shape such as a square, or the body portion may have a curved sidewall such as an arc-shaped sidewall in a part of the body portion such as a corner.

The basic section of the body portion has, e.g., a flattened octagonal shape (rectangle with four chamfered corners). The body portion is disposed in such an attitude that a major axis direction of the section corresponds to the vertical direction of the vehicle. The body portion has the pair of groove portions that are each formed substantially in the middle of each of the pair of long sides substantially parallel to the major axis direction, and that are formed symmetrically with respect to the major axis of the section. The body portion thus has a generally 8-shaped or gourd-shaped section. However, the body portion may be in various forms. For example, the shape of the body portion can be designed as appropriate, and the body portion may have three or more groove portions around the axis of the tubular shape. The groove portion may be in various forms i.e., may have a V-shaped section, a U-shaped section, a semicircular section, a rectangular section, or a trapezoidal section. As described in Patent Document 1, each of a pair of substantially horizontal flat narrow sidewalls located at the top and bottom of the tubular shape may be provided with wing-like flanges extended to the right and left so as to be substantially parallel to the narrow sidewall. It is desirable that the pair of partition walls be placed so as to avoid the groove portions. The groove portions and the partition walls may be provided so as to extend along only a part of the longitudinal length of the tubular shape. However, it is desirable that the groove portions and the partition walls be provided so as to extend along the entire longitudinal length of the tubular shape.

Such a body portion can be molded as a single-piece member including the partition walls by, e.g., extrusion-molding a metal material such as aluminum or aluminum alloy in the axial direction of the tubular shape. However, the body portion can be formed in various forms. For example, a pair of body halves of the tubular shape may be formed from a thin plate material by press work etc., and the pair of body halves may be brought into contact with each other on both sides on the opening side thereof in an overwrapped or confronted manner, and may be joined together by welding to form the tubular shape. The pair of partition walls may then be fixedly attached to the inside of the tubular shape by welding and joining etc.

In the third aspect of the invention, the absolute value [θ] of the tilt angle θ of each of the pair of partition walls with respect to the horizontal direction is in the range of 0°<[θ] ≤20°, and more preferably in the range of about 5°≤[θ]15°. However, depending on the type or manufacturing method of the metal material for extrusion molding, the sectional shape of the tubular shape, etc., the absolute value [θ] of the tilt angle θ may be larger than 20° within such a range that the pair of partition walls do not reach tilted sidewalls. Specifically, in the case where the tilted sidewalls are provided on both upper and lower sides of the wide sidewalls, the partition walls reaching the tilted sidewalls impair bellows-type crushing properties in the axial direction. Accordingly, the absolute value [θ] of the tilt angle θ is set in the range of 0°<[θ]≤[α], where [α] represents the absolute value of the maximum angle of the tilt angle θ at which the partition walls reach the tilted sidewalls. In the third aspect of the invention, the pair of partition walls are provided so as to extend parallel to the axial direction of the tubular shape. However, the pair of partition walls may be disposed so as to be tilted with respect to the axial direction. In the fourth aspect of the invention, the pair of partition walls are tilted symmetrically with respect to the horizontal direction. However, the pair of partition walls may be tilted asymmetrically with respect to the horizontal direction. That is, the pair of partition walls may be different from each other in the absolute value [θ] of the tilt angle θ.

EMBODIMENTS

Embodiments of the present invention will be described in detail below with reference to the accompanying drawings.

Figure 1:
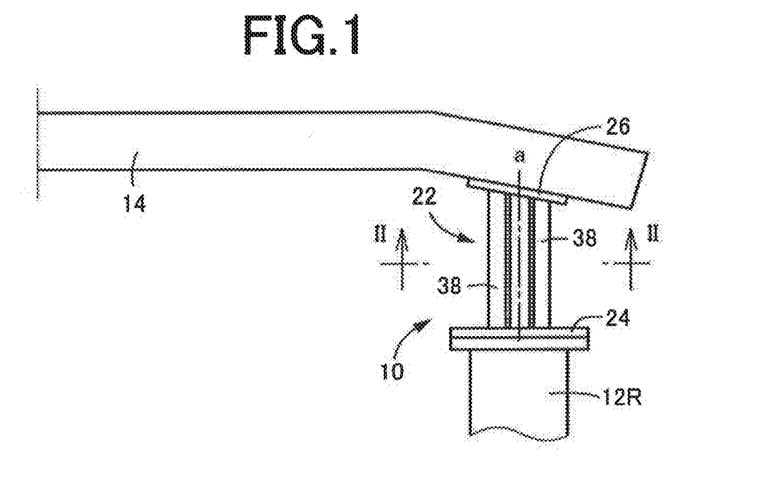
FIG. 1 is a schematic plan view illustrating a crash box (vehicle shock absorbing member) that is an embodiment of the present invention, and showing the manner in which the crash box is disposed.
Figure 2:
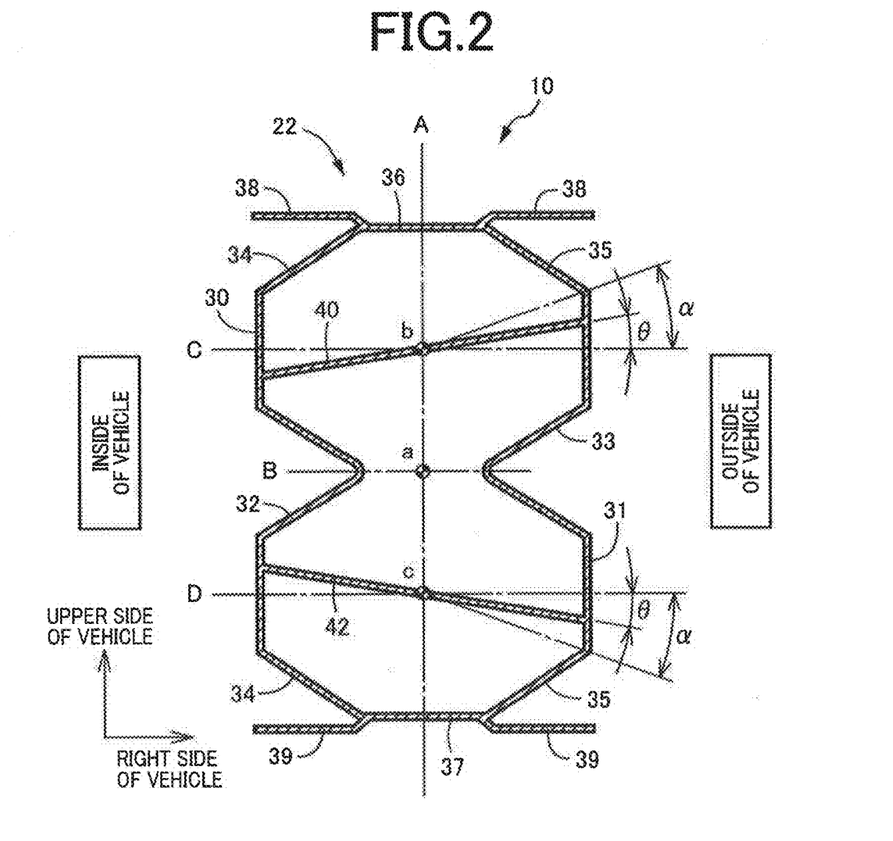
FIG. 2 is a sectional view taken along and viewed in the direction shown by arrows II-II in FIG. 1, showing a sectional shape perpendicular to the axial direction of the crash box in FIG. 1.

A crash box 10 of FIG. 1 is disposed and used between a side member 12R and the right end of a bumper beam 14, and corresponds to the vehicle shock absorbing member of the present invention. FIG. 1 shows in plan the bumper beam 14 in the right half of a vehicle, and the bumper beam 14 is bilaterally symmetrical with respect to the centerline. The crash box 10 includes a body portion 22 having a tubular shape whose basic section is a flattened octagonal closed section as shown in FIG. 2, and a pair of attachment plates 24, 26 fixedly attached to both ends in the axial direction (the direction of an axis a) of the body portion 22 by welding. The crash box 10 is disposed between the side member 12R and the bumper beam 14 in such an attitude that the axis a of the body portion 22 extends substantially parallel to the longitudinal direction of the vehicle, and is fixedly attached to the side member 12R and the bumper beam 14 via the attachment plates 24, 26 by bolts, not shown, etc. FIG. 1 is a schematic plan view showing the manner in which the crash box 10 is disposed. FIG. 2 is a sectional view taken along and viewed in the direction shown by arrows II-II in FIG. 1, showing a sectional shape perpendicular to the axial direction of the crash box 10.

One of both edges in the axial direction of the body portion 22 which is located on the side member 12R side, namely on the attachment plate 24 side, extends perpendicularly to the axis of the body portion 22. The attachment plate 24 is also disposed substantially perpendicularly to the axis a so as to be in close contact with the edge of the body portion 22 along the entire length of the edge, and is fixed to the front end face of the side member 12R so as to be in close contact therewith. The other edge located on the bumper beam 14 side, namely on the attachment plate 26 side, is tilted, in correspondence with the shape of the bumper beam 14, rearward toward the vehicle body with respect to the direction perpendicular to the axis a of the body portion 22 so as to be located closer to the rear of the vehicle as it gets closer to the end of the bumper beam 14. The attachment plate 26 is also tilted with respect to the axis a of the body portion 22 so as to be in close contact with the other edge of the body portion 22 along the entire length of the other edge, and is fixed to the bumper beam 14 so as to be in close contact therewith. When subjected to impact from the front of the vehicle and thus subjected to a compressive load, the crash box 10 is crushed like a bellows in the axial direction. The crash box 10 absorbs impact energy by this deformation, thereby reducing the impact on structural members of the vehicle such as the side member 12R.

As shown in FIG. 2, the basic section of the body portion 22 perpendicular to the axis a has an octagonal shape formed of a vertical rectangle with four chamfered corners, namely an octagonal shape obtained by chamfering four corners of an elongated shape having on its right and left sides a pair of long sides each obtained by connecting two sides adjoining a groove portion 32, 33 by a straight line. The body portion 22 thus has a generally 8-shaped or gourd-shaped section. That is, the body portion 22 has a pair of substantially vertical wide sidewalls 30, 31 forming the long sides of the basic section and extending parallel to each other, four tilted sidewalls 34, 35 tilted obliquely inward from the upper and lower ends of the wide sidewalls 30, 31, and a pair of substantially horizontal narrow sidewalls 36, 37 provided at both ends in the longitudinal direction (the direction of a major axis A) of the basic section so as to extend perpendicularly to the longitudinal direction and parallel to each other and so as to form the short sides of the basic section, and connecting to the tilted sidewalls 34, 35. A pair of the groove portions 32, 33 that are recessed symmetrically with respect to the major axis A so as to have a V-shape pointing toward the inside of the tubular shape are formed in the middle in the lateral direction of the wide sidewalls 30, 31, namely in a substantially horizontal minor axis B portion located in the middle in the vertical direction in FIG. 2. The pair of groove portions 32, 33 are formed along the entire axial length of the tubular body portion 22 so as to extend parallel to the axis a. The major axis A is an axis that coincides with the longitudinal centerline of the elongated section, namely, that passes through the midpoints of the narrow sidewalls 36, 37 located at the upper and lower ends of the body portion 22. The minor axis B is an axis that coincides with the lateral centerline of the elongated section, namely, that passes through the midpoints of the long sides located on the right and left sides. The axis a is the intersection of the major axis A and the minor axis B. The wide sidewalls 30, 31 correspond to the pair of sidewalls located on the right and left sides and separated from each other in the lateral direction of the vehicle.

A pair of wing-like flanges 38, 39 are formed outside in the vertical direction of the pair of narrow sidewalls 36, 37 and integrally with the pair of narrow sidewalls 36, 37. The wing-like flanges 38, 39 are formed along the entire axial length of the tubular body portion 22. In the section of the body portion 22 perpendicular to its axis shown in FIG. 2, the wing-like flanges 38, 39 protrude slightly outward in the vertical direction from the right and left ends of the narrow sidewalls 36, 37, and are extended in the opposite directions from each other so as to extend parallel to the narrow sidewalls 36, 37. The lateral dimension (interval) between both ends (outer ends) of the wing-like flanges 38, 39 is substantially the same as the lateral dimension (interval) between the outer side surfaces of the tubular shape in the lateral direction of the vehicle, namely the outer surfaces of the wide sidewalls 30, 31.

The body portion 22 has a pair of flat plate-shaped partition walls 40, 42 that are disposed in the upper and lower parts of the tubular shape divided by the groove portions 32, 33 such that the partition walls 40, 42 couple the right and left wide sidewalls 31, 30. The partition walls 40, 42 are formed along the entire axial length of the body portion 22 so as to extend parallel to the axis a in the axial direction of the body portion 22. In the section of the body portion 22 perpendicular to its axis shown in FIG. 2, the partition walls 40, 42 pass through intersections b, c of the major axis A and intermediate axes C, D passing through the midpoints of the upper and lower parts of the wide sidewalls 30, 31 divided by the groove portions 32, 33. Moreover, the upper partition wall 40 is tilted downward and the lower partition wall 42 is tilted upward such that the interval between the partition walls 40, 42 decreases closer to the inner side of the vehicle in the lateral direction of the vehicle (the leftward direction in FIG. 2). The absolute values [θ] of tilt angles θ of the partition walls 40, 42 with respect to the horizontal direction (the intermediate axes C, D) are the same. The partition walls 40, 42 are tilted symmetrically with respect to the horizontal direction and are disposed symmetrically with respect to the minor axis B, and the tilt angle θ is determined in the range of $0°<[θ]≤20°$. The absolute value [θ] of the tilt angle θ of each partition wall 40, 42 is equal to or smaller than the absolute value [α] of a maximum angle α at which the partition wall 40, 42 can be coupled to the wide sidewalls 30, 31, so that both ends of each partition wall 40, 42 are coupled to the wide sidewalls 30, 31. In the present embodiment, the absolute value [α] of the maximum angle α is 20°, and the absolute value [θ] of the tilt angle θ is 10°.

In the present embodiment, such a body portion 22 is formed as a single-piece member by extrusion molding of an aluminum alloy, and is molded integrally with the wing-like flanges 38, 39 and the partition walls 40, 42 so as to have a substantially constant thickness dimension. The crash box 10 configured as described above is disposed and used between the side member 12R and the bumper beam 14 in such an attitude that the pair of wide sidewalls 30, 31 are located on both sides in the lateral direction of the vehicle and that the major axis A extends substantially parallel to the vertical direction of the vehicle.

According to this crash box 10, the pair of flat plate-shaped partition walls 40, 42 are provided so as to be separated from each other in the vertical direction with the groove portions 32, 33 interposed therebetween and so as to couple the wide sidewalls 30, 31 on both sides thereof in the lateral direction of the vehicle. Moreover, the pair of partition walls 40, 42 are tilted so that the interval therebetween decreases as they get closer to the inner side of the vehicle in the lateral direction of the vehicle. This improves resistance to lateral buckling under an impact load that is applied obliquely from the outside of the vehicle. Accordingly, even if the crash box 10 is subjected to a moment load M (see FIG. 4) due to an impact load applied obliquely in the lateral direction of the vehicle, lateral buckling is suppressed by the presence of the pair of partition walls 40, 42, whereby excellent shock absorbing performance is stably obtained. In particular, in the present embodiment, the wing-like flanges 38, 39 are formed integrally with the pair of narrow sidewalls 36, 37. This further improves the resistance to lateral buckling under the impact load that is applied obliquely in the lateral direction, whereby excellent shock absorbing performance is more stably obtained.

The pair of partition walls 40, 42 are provided so as to be separated from each other in the vertical direction with the groove portions 32, 33 interposed therebetween, and the both ends of the partition walls 40, 42 are coupled to the wide sidewalls 30, 31 integrally therewith. This can improve the resistance to lateral buckling without degrading bellows-type crushing properties due to the groove portions 32, 33, whereby excellent shock absorbing performance is more stably obtained.

The crash box 10 of the present embodiment is molded as a single-piece member by extrusion molding of an aluminum alloy. The pair of partition walls 40, 42 are provided parallel to the axis a of the body portion 22, and the absolute value [θ] of the tilt angle θ of each partition wall 40, 42 with respect to the horizontal direction is in the range of 0°<[θ] ≤20°. This can improve the resistance to lateral buckling while ensuring extrusion moldability.

The pair of partition walls 40, 42 are tilted symmetrically with respect to the horizontal direction and are disposed symmetrically with respect to the minor axis B. Accordingly, the moment load M etc. is substantially uniformly applied to the pair of partition walls 40, 42, and the resistance to lateral buckling can be appropriately improved.

Figure 3:
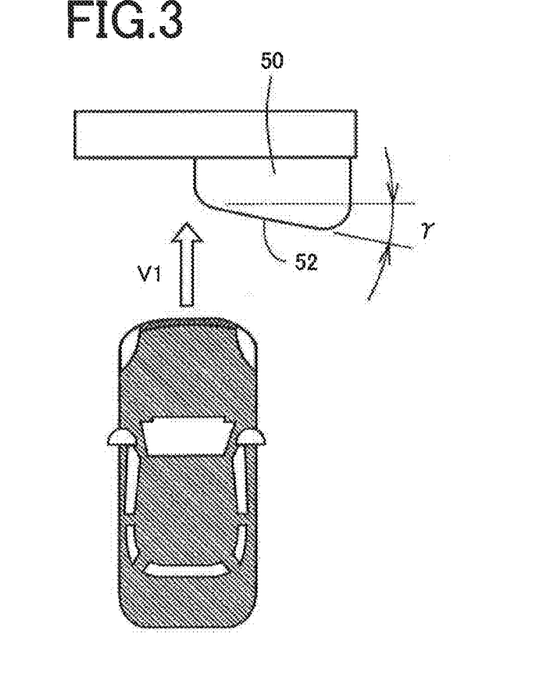
FIG. 3 is a diagram illustrating an offset crash test in which an impact load is applied obliquely in the lateral direction of the vehicle.
Figure 4:
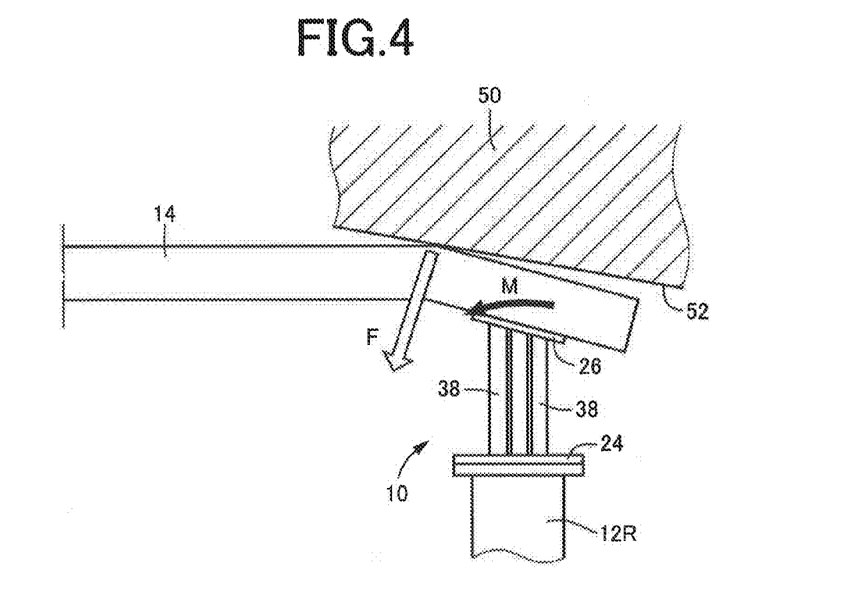
FIG. 4 is a diagram illustrating a mechanism in which the crash box is subjected to a moment load M in the offset crash test illustrated in FIG. 3.
Figure 5:
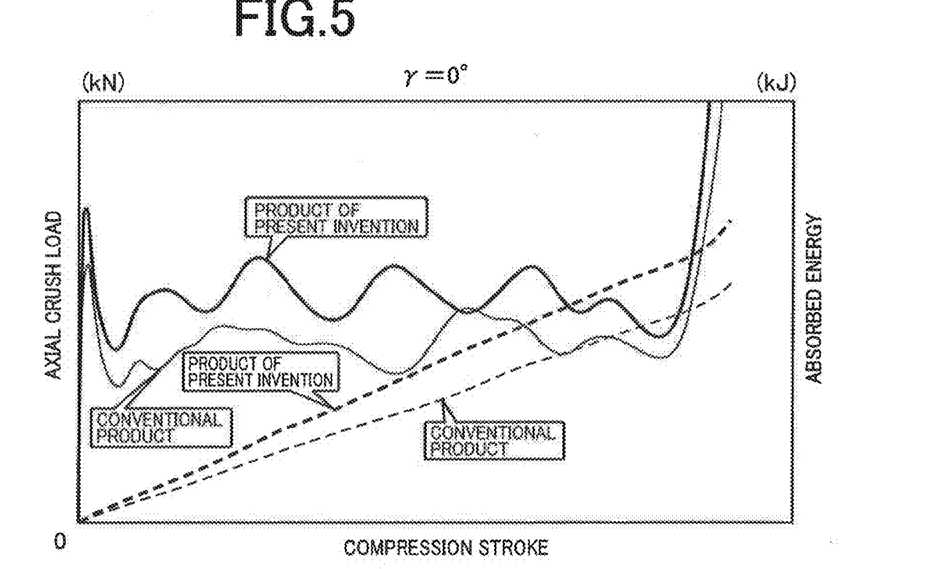
FIG. 5 is a diagram showing comparison of properties of change in axial crush load (solid line) and absorbed energy (dashed line) with respect to compression stroke between the product of the present invention (with the partition walls) and a conventional product (with no partition wall). This comparison was made by simulating by FEM analysis of a crushing process in the offset crash test of FIG. 3 performed at a barrier angle γ of 0°.
Figure 6:
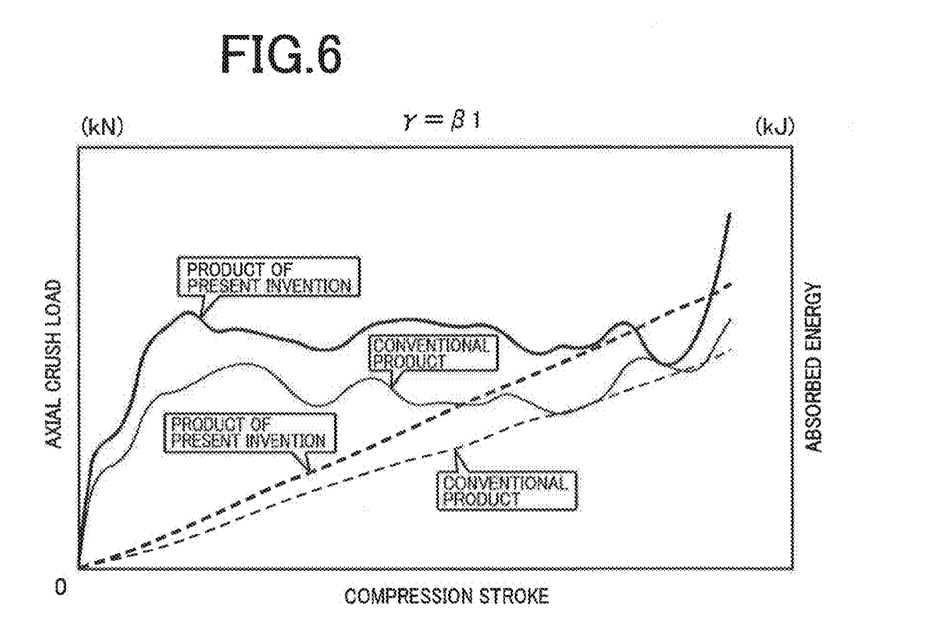
FIG. 6 is a diagram corresponding to FIG. 5, and showing comparison of properties of change in the axial crush load and the absorbed energy with respect to the compression stroke between the product of the present invention and the conventional product. This comparison was made in the offset crash test performed at a barrier angle γ of β1.
Figure 7:
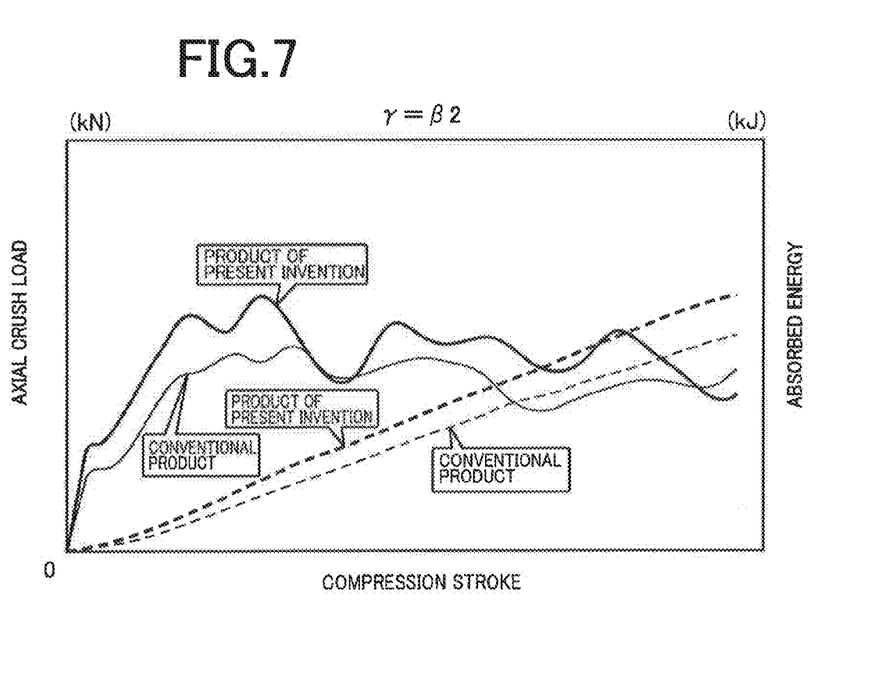
FIG. 7 is a diagram corresponding to FIG. 5, and showing comparison of properties of change in the axial crush load and the absorbed energy with respect to the compression stroke between the product of the present invention and the conventional product. This comparison was made in the offset crash test performed at a barrier angle γ of β2.
Figure 8:
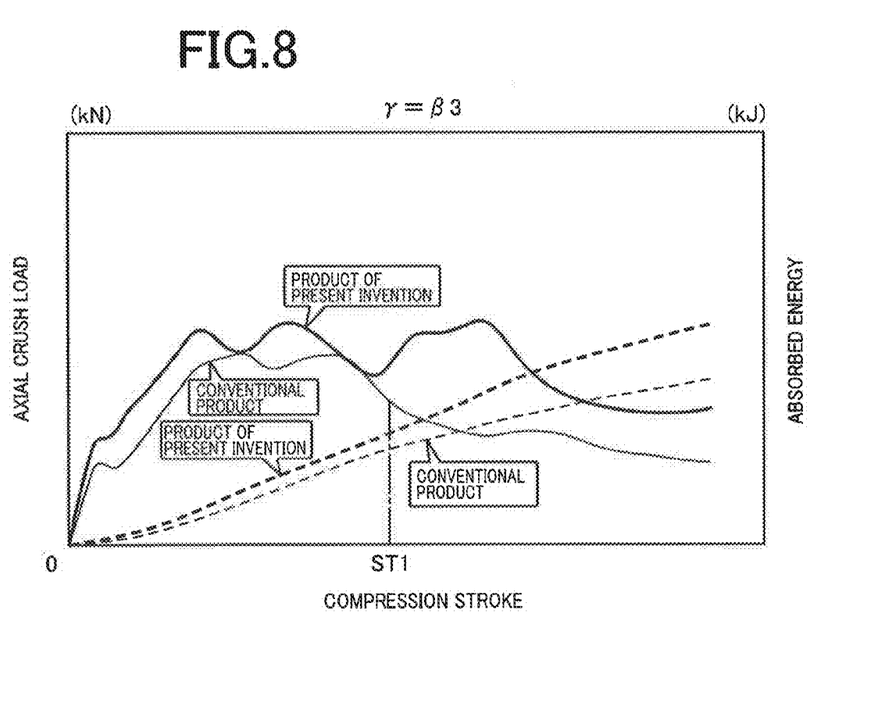
FIG. 8 is a diagram corresponding to FIG. 5, and showing comparison of properties of change in the axial crush load and the absorbed energy with respect to the compression stroke between the product of the present invention and the conventional product. This comparison was made in the offset crash test performed at a barrier angle γ of β3.
Figure 9:
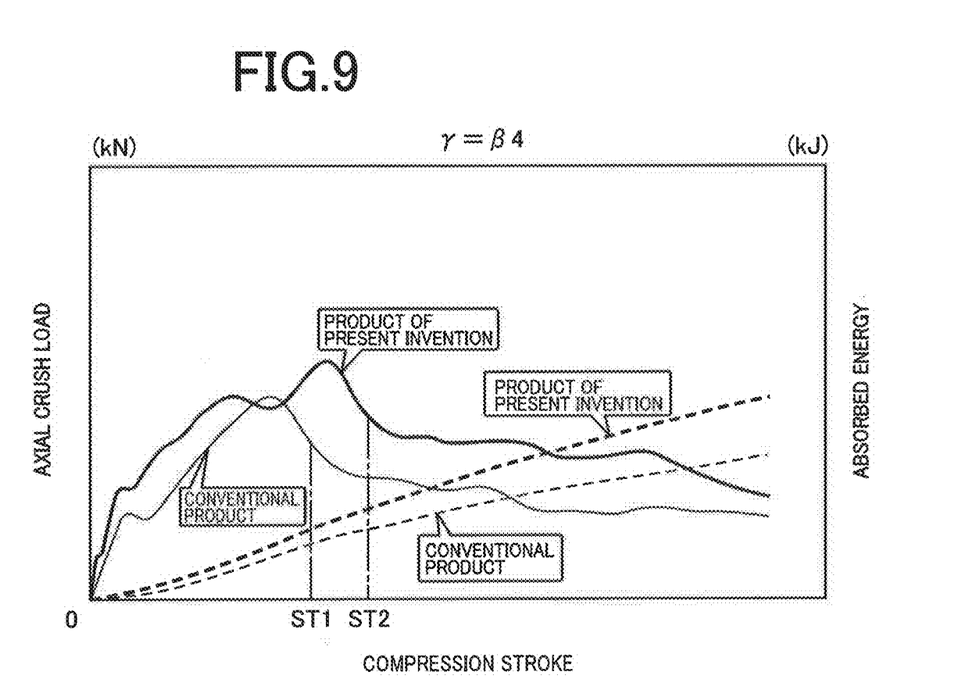
FIG. 9 is a diagram corresponding to FIG. 5, and showing comparison of properties of change in the axial crush load and the absorbed energy with respect to the compression stroke between the product of the present invention and the conventional product. This comparison was made in the offset crash test performed at a barrier angle γ of β4.

FIG. 4 shows the case where the crash box 10 is subjected to an inward (counterclockwise in FIG. 4) moment load M toward the inside of the vehicle due to a load F that is obliquely applied from the tilted crash surface 52 in an offset crash test using the crash barrier 50 in FIG. 3. Since the pair of partition walls 40, 42 are provided in addition to the wing-like flanges 38, 39 extending in the lateral direction of the vehicle, lateral buckling due to the moment load M is effectively suppressed.

FIGS. 5 to 9 are diagrams showing comparison of properties of change in axial crush load (solid lines) and absorbed energy (dashed lines) with respect to compression stroke between the product of the present invention (with the partition walls) and a conventional product (with no partition wall). This comparison was made by simulating by FEM analysis of a crushing process in the offset crash test of FIG. 3 performed at a barrier angle γ of 0°, β1, β2, β3, and β4 (0°<β1<β2<β3<β4) and a vehicle speed V1 of 16 km/h. FIG. 10 is a diagram illustrating deformation of the product of the present invention and the conventional product in nine stages at fixed time intervals at the barrier angle γ of β1, β2, β3, and β4 based on the above simulation results. These simulation results show that neither the product of the present invention nor the conventional product laterally buckled at the barrier angle γ of up to β2, but there is a clear difference in resistance to lateral buckling between the product of the present invention and the conventional product at the barrier angle γ of β3 or more. That is, only the conventional product laterally buckled at the barrier angle γ of β3, and the lateral buckling started at a compression stroke ST1 in FIG. 8. The sixth stage at the barrier angle γ of β3 in the conventional product (the left column) of FIG. 10 corresponds to the time the lateral buckling started. Both the product of the present invention and the conventional product laterally buckled at the barrier angle γ of β4. At this barrier angle, the lateral buckling of the conventional product started at a compression stroke ST1 in FIG. 9, whereas the lateral buckling of the product of the present invention started at a compression stroke ST2 larger than the compression stroke ST1. This shows that the product of the present invention has higher resistance to lateral buckling than the conventional product. The fifth stage at the barrier angle γ of β4 in the conventional product of FIG. 10 corresponds to the time the lateral buckling started, and the sixth stage at the barrier angle γ of β4 in the product of the present invention of FIG. 10 corresponds to the time the lateral buckling started. As can be seen from the properties of change in absorbed energy (dashed lines) in FIGS. 5 to 9, the product of the present invention has better shock absorbing performance than the conventional product in the entire range of the compression strokes at every barrier angle because the product of the present invention has an increased section due to the presence of the pair of partition walls 40, 42.

Figure 11:
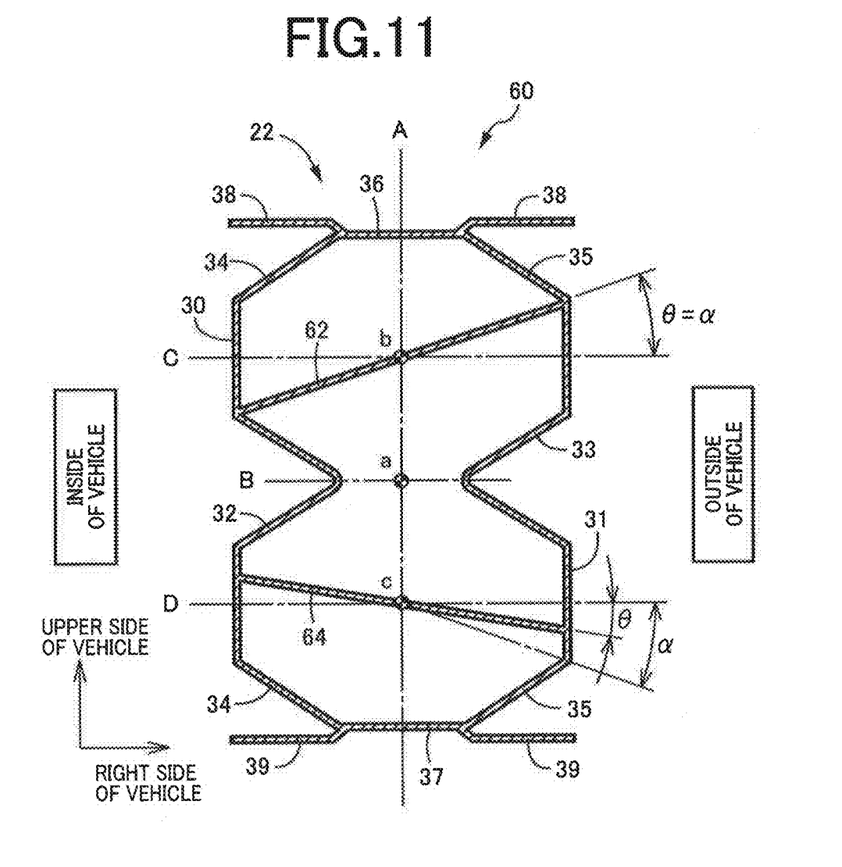
FIG. 11 is a sectional view illustrating another crash box of the present invention, and corresponding to FIG. 2.

In the crash box 10 of the above embodiment, the pair of partition walls 40, 42 are tilted symmetrically with respect to the horizontal direction and are disposed symmetrically with respect to the minor axis B. However, as in, e.g., a crash box 60 of FIG. 11, a pair of partition walls 62, 64 may be disposed asymmetrically with respect to the horizontal direction. In this embodiment, the absolute value [θ] of the tilt angle θ of the upper partition wall 62 is equal to the absolute value [α] (=20°) of the maximum angle α, whereas the absolute value [θ] of the tilt angle θ of the lower partition wall 64 is smaller than the absolute value [α] of the maximum angle α and is equal to 10°.

Although the embodiments of the present invention are described above in detail based on the drawings, the embodiments are shown by way of example only, and the present invention can be embodied in various modified or improved forms based on the knowledge of those skilled in the art.

NOMENCLATURE OF ELEMENTS 10, 60: crash box (vehicle shock absorbing member) 12R: side member (vehicle body-side member) 14: bumper beam (bumper member) 30, 31: wide sidewalls (a pair of sidewalls) 32, 33: groove portion 40, 42, 62, 64: partition walls a: axis θ: tilt angle

The invention claimed is:

1. A vehicle shock absorbing member, which has a tubular shape having a plurality of flat plate-shaped sidewalls and having a closed section, in which, of the plurality of sidewalls, each of a pair of sidewalls located on right and left sides and separated from each other in a lateral direction of a vehicle has a groove portion formed extending in an axial direction of the tubular shape so as to be recessed inward, which is disposed between a vehicle body-side member and a bumper member in such an attitude that the axial direction corresponds to a longitudinal direction of the vehicle, and which, when subjected to a compressive load, is crushed like a bellows in the axial direction to absorb impact energy, a pair of flat plate-shaped partition walls being formed in the tubular shape integrally with the tubular shape so as to be separated from each other in a vertical direction and so as to couple the pair of sidewalls, and the upper partition wall being tilted downward and the lower partition wall being tilted upward such that an interval between the pair of partition walls decreases closer to an inner side of the vehicle in the lateral direction of the vehicle.

2. A vehicle shock absorbing member, which has a tubular shape with a closed section that has an elongated shape with a pair of parallel long sides separated from each other in a lateral direction of a vehicle, in which each of a pair of wide sidewalls forming the long sides has a groove portion formed extending in an axial direction of the tubular shape so as to be recessed inward, which is disposed between a vehicle body-side member and a bumper member in such an attitude that the axial direction corresponds to a longitudinal direction of the vehicle, and which, when subjected to a compressive load, is crushed like a bellows in the axial direction to absorb impact energy,     a pair of flat plate-shaped partition walls being formed integrally with the tubular shape so as to be disposed in upper and lower parts of the tubular shape divided by the groove portions such that the pair of partition walls couple the pair of wide sidewalls, and     the upper partition wall being tilted downward and the lower partition wall being tilted upward such that an interval between the pair of partition walls decreases closer to an inner side of the vehicle in the lateral direction of the vehicle.

3. The vehicle shock absorbing member according to claim 1, wherein the vehicle shock absorbing member is a member produced by extrusion molding of a metal, and     the pair of partition walls and the pair of sidewalls are formed integrally each other to extend parallel to the axial direction, and in a section perpendicular to the axial direction, an absolute value [θ] of a tilt angle θ of each of the pair of partition walls with respect to a horizontal direction is in a range of 0°<[θ]≤20°.

4. The vehicle shock absorbing member according to claim 1, wherein the pair of partition walls are tilted symmetrically with respect to the horizontal direction in the section perpendicular to the axial direction.

5. The vehicle shock absorbing member according to claim 2, wherein the pair of partition walls are tilted symmetrically with respect to the horizontal direction in the section perpendicular to the axial direction.

6. The vehicle shock absorbing member according to claim 2, wherein the vehicle shock absorbing member is a member produced by extrusion molding of a metal, and     the pair of partition walls and the pair of wide sidewalls are formed integrally each other to extend parallel to the axial direction, and in a section perpendicular to the axial direction, an absolute value [θ] of a tilt angle θ of each of the pair of partition walls with respect to a horizontal direction is in a range of 0°<[θ]≤20°.

\* \* \* \* \*